April 14, 1970  A. V. TANTILLO  3,506,326
HINGE MEANS
Filed Jan. 18, 1968
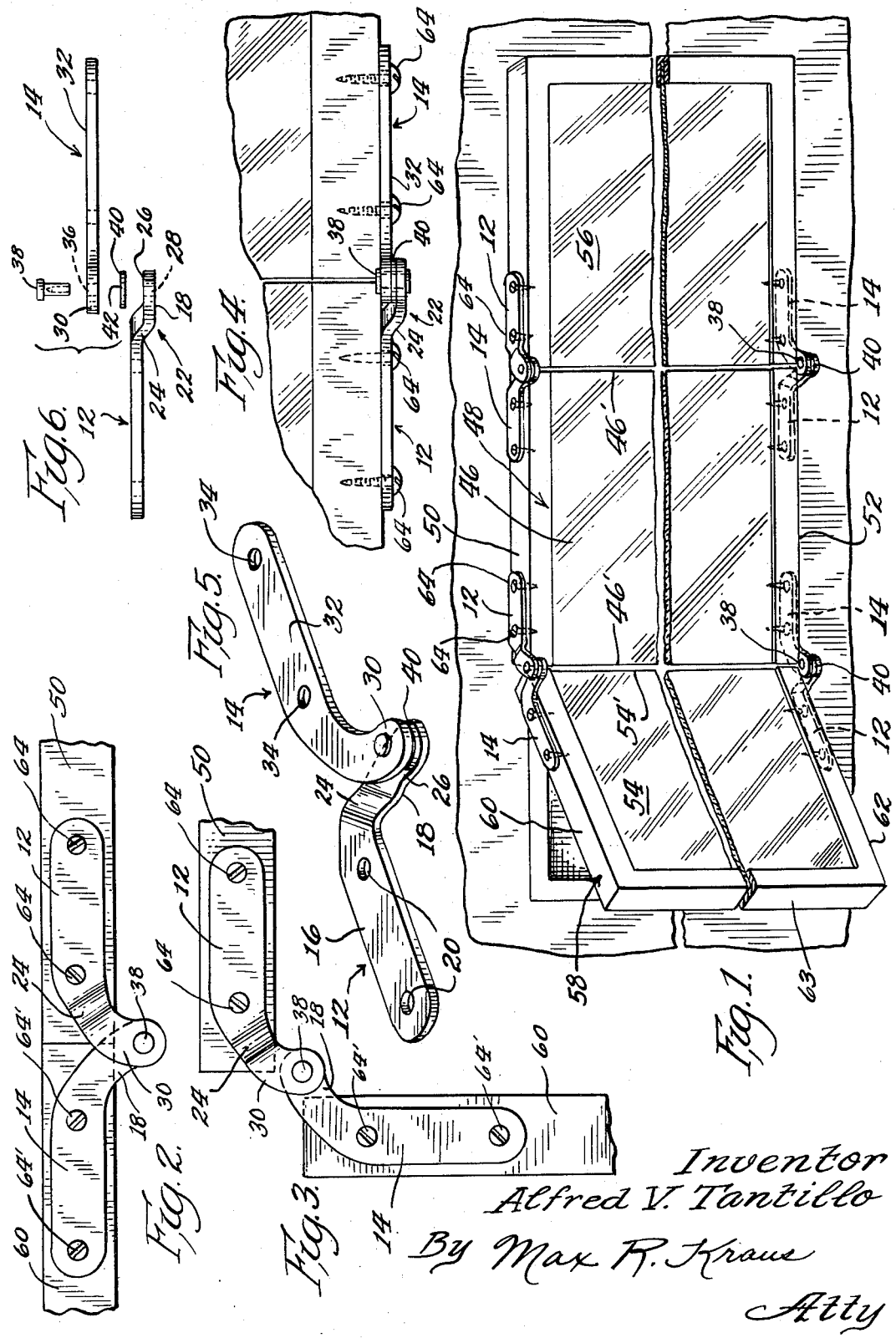
Inventor
Alfred V. Tantillo
By Max R. Kraus
Atty

United States Patent Office 3,506,326
Patented Apr. 14, 1970

---

3,506,326
HINGE MEANS
Alfred V. Tantillo, Arlington Heights, Ill., assignor to General Bathroom Products Corp., Elk Grove Village, Ill.
Filed Jan. 18, 1968, Ser. No. 698,956
Int. Cl. A47b *67/02;* E05d *7/02*
U.S. Cl. 312—227                         1 Claim

ABSTRACT OF THE DISCLOSURE

Hinge means for medicine cabinets and the like to provide a pivotal or hinging movement of one mirror or section or panel with respect to another, wherein the hinge means are mounted at the top and bottom and permit the inner sides of the adjacent mirrors to contact each other when in alinement, thereby eliminating the spacing between the mirrors and providing a continuous mirror surface.

---

This invention relates to improvements in hinge means.

It has particular application in connection with the pivotal mounting of mirrors and the like in connection with medicine cabinets and other bathroom cabinets, although it is not limited thereto.

Bathroom cabinets which are mounted on the wall are usually provided with mirrors, with one of said mirrors being hingedly or pivotally mounted with respect to the stationary mounted mirror. In mounting the pivoted mirror in relation to the stationary mirror, hinge means between the mirrors are used to pivotally or hingedly connect the mirrors. The pivotal connections of said hinge means extend along the inner edges of two adjacent mirrors. This necessitates a spacing between the two adjacent mirrors to accommodate the pivotal connections of said hinges. The said hinges usually extend along the full height of the mirrors. The gap or spacing between the mirrors detracts from the appearance of a continuous mirror surface which is highly desirable. Furthermore, mounting a series of hinges along the height of the mirrors adds considerably to the cost.

With the present invention all of these objectionable features are eliminated in that there is provided a unique, novel and improved hinge means which is secured only along the top and bottom edges of the mirror frame members. This permits the adjacent inner edges of the mirror sections to be positioned in such close proximity to each other as to be in edge to edge contact and eliminates the space or gap therebetween. While the inner adjacent edges of the adjacent mirrors touch each other when they are alined, one mirror may be readily pivoted with respect to the other mirror without breaking of the mirrors. The unsightly hinges between the mirror edges are eliminated, it is more economical, and provides in effect a continuous mirror surface.

BRIEF DESCRIPTION OF THE DRAWINGS

In the drawings:

FIG. 1 is a perspective view broken away, showing a medicine cabinet with the mirrors mounted utilizing the hinging means of this invention.

FIG. 2 is a top plan view showing the hinging means connected to the top of the mirror supporting frames, with the mirrows alined and positioned edge to edge.

FIG. 3 is a view similar to FIG. 2 but with one of the mirrors pivoted with respect to the other.

FIG. 4 is an elevational view showing the hinging means secured to the bottom of the mirror supporting frames.

FIG. 5 is a perspective view of the hinging means as they would be positioned at the bottom of the mirror supporting frames, and FIG. 6 is an end elevational exploded view of the hinging elements.

The hinge means generally identified by the numeral 10 are best shown in unattached position in perspective in FIG. 5. The manner of securement of the hinge means to the mirror supporting frame members is best shown in FIGS. 1, 2, 3 and 4.

The hinge means 10 comprise a pair of members 12 and 14. The hinge member 12 consists of a flat elongated body portion 16 provided with a forwardly continuing curved extension 18 at the inner end of the elongated body, which gives the hinge member a generally J-shaped configuration in plan. The elongated body portion 16 is provided with a pair of spaced openings 20 through which the fastening elements extend, as will be subsequently described. The forwardly extending extension 18 is offset from the plane of the body portion 16 as indicated at 22.

The extension 18 has a short intermediate portion 24 which inclines from the plane of the body portion 16. The remainder or outer portion 26 of the extension is on a substantially flat plane generally parallel to the plane of the body portion 16, therefore, the portion 26 of the extension 18 is offset from the plane of the elongated body 16. An opening 28 is provided in the outer portion 26 of the extension 18. The inner end of the body portion 16 adjacent the extension, as well as the extension 18 is narrower than the width of the body portion 16.

The other hinge member 14, in plan view, is shaped similar to hinge member 12 and has a J-shaped configuration, but the extension 30 thereon which continues forwardly of the body portion 32 is not offset as is the extension 18 but is on the same plane with its elongated body portion 32. The elongated body portion 32 is provided with spaced openings 34. An opening 36 is provided in the extension 30.

The two hinge members 14 and 16 are pivotally connected at their extensions by a pin or rivet 38 passing through the two alined openings 28 and 36. A thin washer 40 having an opening 42 is positioned between the extensions 18 and 30 with the pin or rivet 38 passing through the opening 42. The opposite ends of the pin or rivet are flattened to provide heads which permanently anchor the pin to the hinge members. Thus, the two hinge members are permanently pivotally secured with respect to each other. When the hinge members are thus connected the elongated body portions 16 and 32 are on the same plane so that they can be secured to the top and bottom of the mirror supporting frames, as will now be described.

The hinge means 10 which is secured to the top of the mirror supporting frames is identical to the hinge means 10 secured to the bottom of the frames. The only difference is that the hinge means at the bottom is inverted from the hinge means at the top when they are attached to the mirror supporting frames. The use of the hinge means in connection with a bathroom medicine cabinet, which is best shown in FIG. 1, will now be described.

The medicine cabinet generally indicated by the numeral 44 is mounted on a bathroom wall in the usual manner. The cabinet has a central stationary mirror 46 secured in a supporting frame 48 which is secured to the cabinet in the usual manner. The mirror supporting frame 48 has the conventional top 50 and bottom 52. The opposite side edges 46' of mirror 46 are exposed. The opposite end mirrors 54 and 56 are pivotally connected to the central mirror 46. Since both end mirrors are similarly connected only one end mirror 54 will be described in detail. Mirror 54 is supported in a frame 58 having a top 60, a bottom 62 and an outer side 63. The inner side edge 54' of the mirror 54 is exposed. The top hinge means 10 is positioned and attached to the frame members of the cabinet, as shown in FIGS. 1, 2 and 3. The hinge member 12 is secured to the top 50 of the central frame by fastening elements 64 passing through the openings 20. The hinge member 14 is secured to the top 60 of the frame member 58 by similar fastening elements 64' passing through the openings 34. The hinge members are positioned so that the outer ends of extensions 18 and 30 of the hinge members extend forwardly of the mirrors and their respective frames. As can best be seen in FIG. 2, the pivot pin 38 will be positioned forwardly of the mirrors and their frames and the axis of the pivot pin will be forwardly of but in vertical alinement with the adjacent inner sides 46' and 54' of the adjacent mirrors 46 and 54. This arrangement permits the adjacent sides 54' and 46' of the mirrors to contact and provide a continuous mirror surface between the mirrors 46 and 54 when they are in alinement, as shown in FIG. 2. However, the mirror 54 may be pivoted forwardly with respect to the mirror 46, as shown in FIGS. 1 and 3, for access to the interior of the cabinet. The pivoting will not cause the exposed mirror edges 54' and 46' or the mirrors to break or be damaged.

In mounting the hinge means 10 at the bottom of the cabinet the hinge means are inverted from the mounting at the top. This is seen in FIGS. 1, 4 and 5. In this inverted position the hinge member 12 is connected to the bottom 62 of the frame and the hinge member 14 is secured to the bottom 52 of the central frame. In inverted position the hinge extensions extend forwardly of the mirrors and the pivot pin 30 of the bottom hinge is in vertical alinement with the top pivot pin 30.

The mirror 56 is pivotally mounted with respect to the central mirror 46. In this instance the top hinge member 12 is connected to the frame of mirror 56 and hinge member 14 is connected to the central mirror frame. The bottom hinge members are inverted as previously described.

Obviously, cabinets may be constructed with only one hingedly mounted mirror instead of the two shown in the drawings. Also, the hinge means may be used for hingedly mounting doors, panels and the like and some are not restricted to the mounting of mirrors.

It will be understood that various changes and modifications may be made from the foregoing without departing from the spirit and scope of the invention.

I claim:

1. A bathroom cabinet having a stationary frame and mirror therein and a frame and mirror therein mounted for pivotal movement with respect to said stationary frame and mirror by hinge means only at the top and bottom thereof, said top hinge means comprising a pair of top hinge members, one of said top hinge members having a body and a forward extension on the same plane forming a generally J-configuration in plan, with said body secured to the top of either said stationary or pivotal frame member, the other top hinge member having a body secured to the top of the other said frame and having a forward extension which is shaped to form an upwardly inclined portion and terminating in a horizontal plane parallel with but above the plane of the said last mentioned hinge body, a pivot pin connecting the two extensions forwardly of the frames, a pair of bottom hinge members connected to the bottom of said frames, said bottom hinge members being identical to said top hinge members but with one of the bottom hinge members shaped to form a downwardly inclined portion and terminating in a horizontal plane parallel with but below the plane of the body of said bottom hinge member.

References Cited

UNITED STATES PATENTS

| 845,519 | 2/1907 | Caley. |
| 2,621,360 | 12/1952 | Hurlin _____ 16—135 XR |
| 3,244,464 | 4/1966 | McMurtrie et al. ____ 312—227 |

FOREIGN PATENTS

| 227,728 | 3/1960 | Australia. |
| 201,468 | 1/1959 | Austria. |

DONALD A. GRIFFIN, Primary Examiner

U.S. Cl. X.R.

16—135